United States Patent Office.

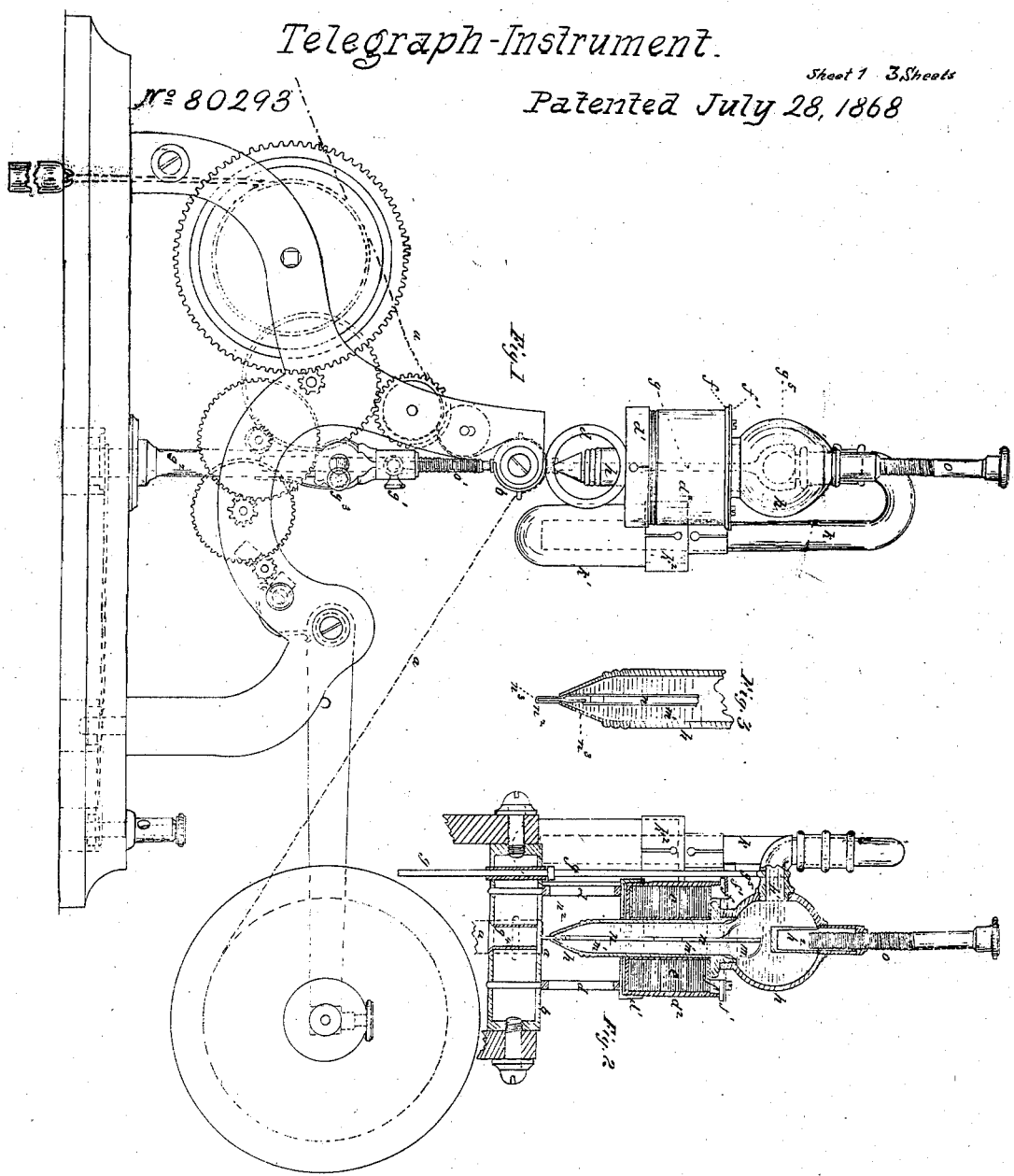

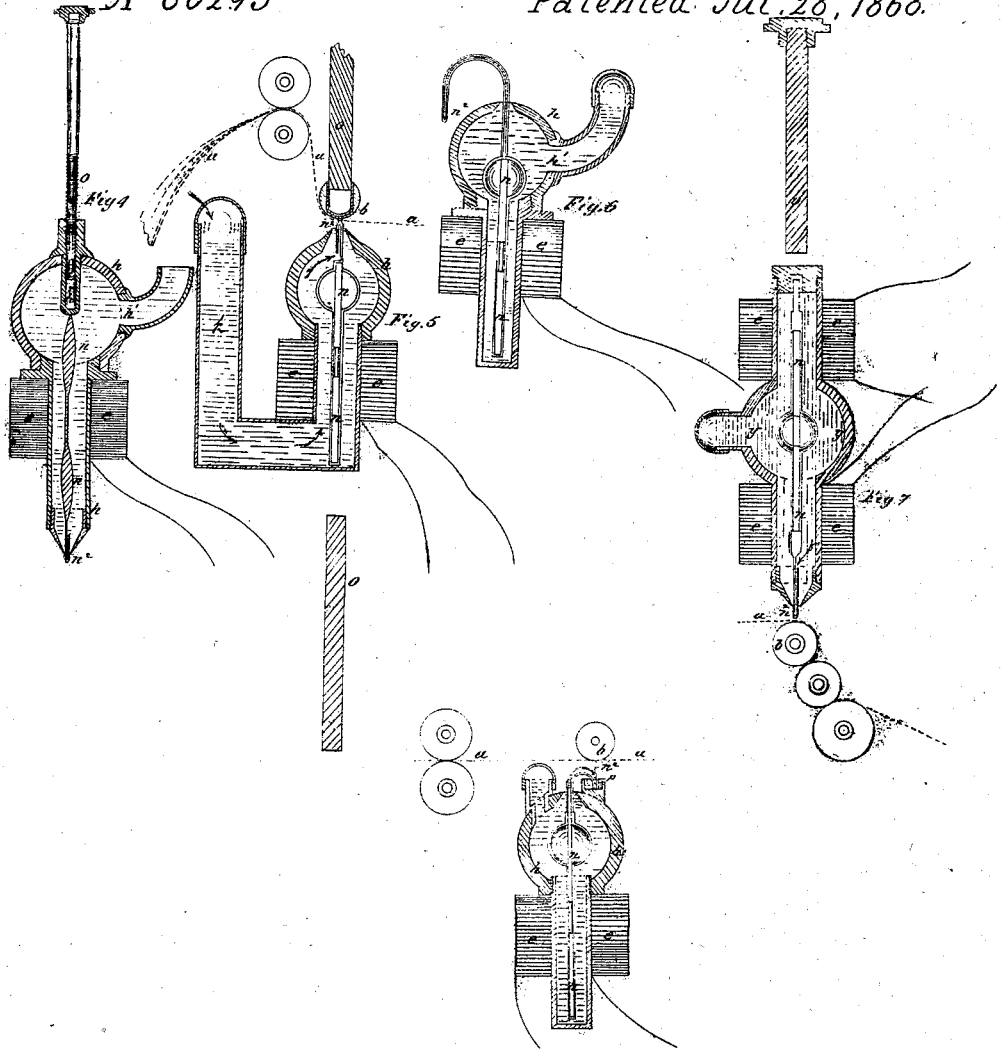

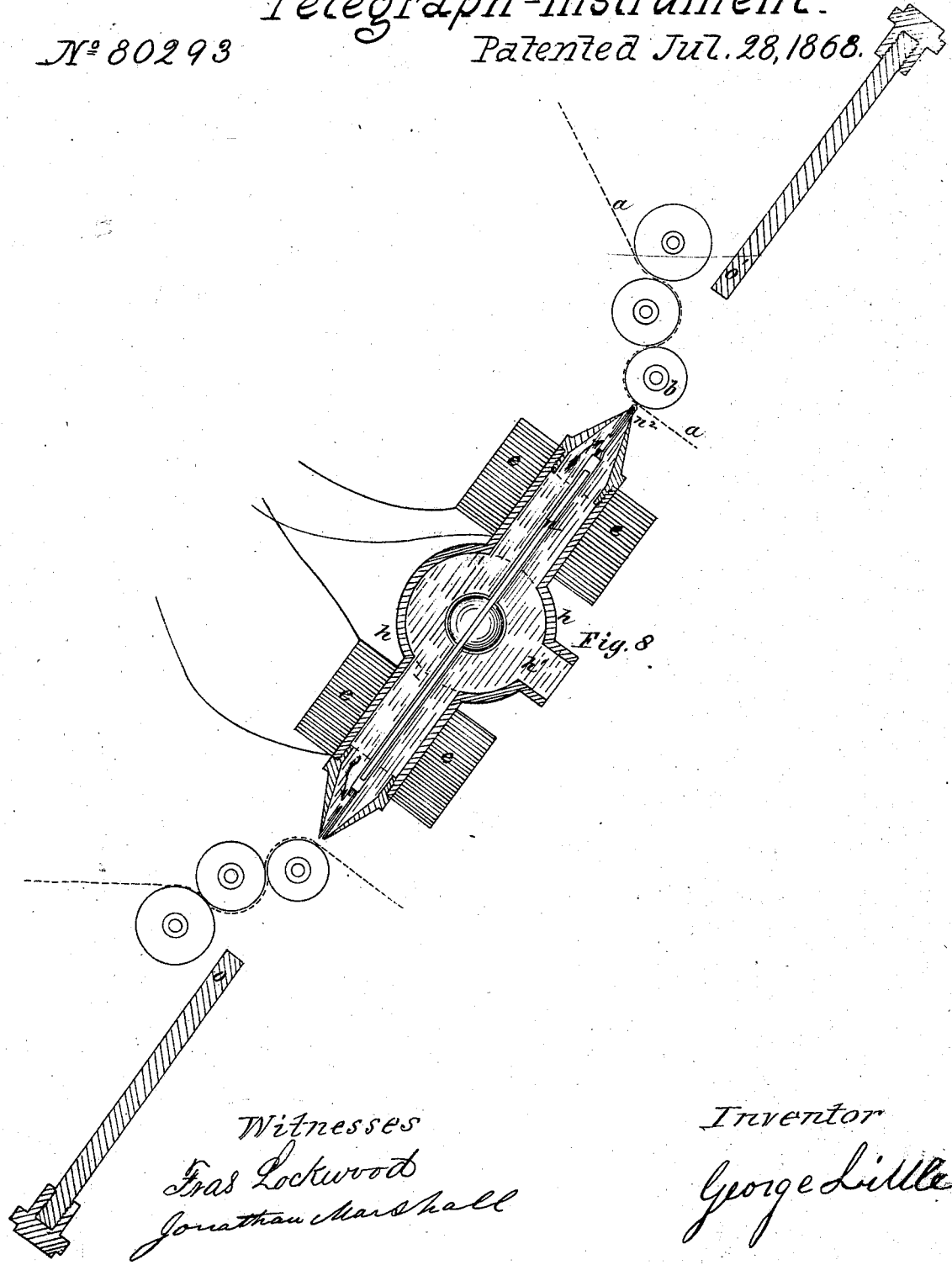

GEORGE LITTLE, OF HUDSON CITY, NEW JERSEY.

Letters Patent No. 80,293, dated July 28, 1868.

IMPROVEMENT IN TELEGRAPH-INSTRUMENTS.

The Schedule referred to in these Letters Patent and making part of the same.

TO ALL WHOM IT MAY CONCERN:

Be it known that I, GEORGE LITTLE, of Hudson City, Bergen county, and State of New Jersey, have invented certain new and useful Improvements in Telegraphs; and that the following, taken in connection with the drawings, is a full, clear, and exact description thereof.

Sheet I, of the drawings, represents all my improvements in the form in which I prefer to embody them, being drawings of a working machine, full size, with the exception of fig. 3, which is on a larger scale.

On sheet I—

Figure 1 is an elevation of the whole machine,

Figure 2 a partial vertical transverse section, and

Figure 3 is a vertical section through a pen and an ink-reservoir on a large scale.

Sheet II exhibits some of the various plans which I have contemplated for the embodiment of my invention in different forms. The several figures in this sheet will be specially referred to hereafter.

The general idea upon which my invention is based is the employment of a pen or marker, partially sustained or floating in fluid, either the ink itself or some other fluid; such pen consisting of either a body capable of being magnetized by induction, or one or more permanent magnets, and a marking-point, and being placed in a telegraphic instrument in relation to a coil or coils; that the making and breaking of a voltaic or electric circuit or current through the coils, or the change of direction of a circuit, will cause the pen to oscillate or vibrate, and make marks upon paper or other material suitable for the purpose.

And the nature of my invention consists—

First, in the combination of a pen with a reservoir containing fluid, when the fluid floats or partially floats the pen.

Second, in the combination of a pen with a reservoir containing fluid, and a coil or coils of wire placed in such relation thereto that the pen shall be influenced by voltaic or electric currents passing through the coil.

Third, in the combination of a pen with a reservoir holding fluid, a coil of wire, located as before described, and paper, actuated by proper machinery, and in such relation to the pen that the oscillations of the pen may make marks thereon.

Fourth, the combination of a pen with a reservoir of fluid, and paper properly moved and held in such relation thereto that the oscillations or vibrations of the pen may make marks or signs upon the paper.

Fifth, the combination of a pen with a reservoir of fluid, and a float, supporting or aiding to support the weight of the pen, and these in combination with a properly-located coil, and also with properly-located paper.

Sixth, in the combination of a pen and a reservoir of fluid, having an aperture through which the marking-part of the pen projects, with a regulating-tube, and these in combination with a coil properly located, and also in combination with paper properly located and moved.

Seventh, in the combination of a pen with a reservoir of fluid, and a permanent magnet supported in such relation to the pen as to influence its position in the fluid, and these in combination with a coil arranged so as to influence the position of the pen, when currents of galvanism or electricity are passed through the coil.

Eighth, in the combination of a pen with a reservoir of fluid, and a coil, when the pen is so arranged as to pass through an opening in the bottom of the reservoir, and the reservoir is vertical and surrounded by the coil, and these in combination with a regulating-tube.

Ninth, in the combination of a pen with a reservoir of fluid, having an opening at the bottom thereof, and a coil surrounding the reservoir, and a magnet arranged above the reservoir, and also of these in combination with a magnet arranged below the reservoir.

Tenth, in the combination of these elements, viz, a pen, a float, a reservoir of fluid, a regulating-tube, a coil, and paper properly moved, and these in combination with a magnet, so arranged as to influence the position of the pen.

All these combinations being and operating substantially as hereinafter set forth.

By the word "pen" throughout this description, I mean an instrument capable of making marks when oscillated, and composed of not only a marking-part, portion, or point, but also of metal, capable of being magnetized by induction, or a magnet or magnets, the metal or magnet or magnets and the marking-part being so connected that when one moves, the other moves, the two forming but a single instrument, although I intend sometimes to connect them by joints instead of rigidly.

By "coil," I mean any proper coil of wire, such as is usually employed in telegraphic machinery or apparatus And by "properly-moved paper," I mean paper caused to travel in a straight or curved line, or in that of the thread of a screw, or moved to and fro in any manner known to telegraphers, so long as it be so moved as that a pen which oscillates shall make marks thereon, owing to the combined movement of the pen and paper.

In my working-machine, I have employed the ordinary Morse machinery for moving the paper, and I deem it unnecessary to describe any batteries, or line-wires, or cables, or instruments for making or breaking circuit, or switches, or pole-changers, as such in various forms are well known, and form no part of my invention; neither do I intend to describe the operation of coils, through which electric or voltaic currents are passed, changed, or broken, in imparting motion, either to magnets, or metal capable of being magnetized by induction, the effects of a coil, in connection with a battery, to move certain bodies, being well known.

In the machine which I prefer, represented upon Sheet I, the paper, $a$, is drawn by proper self-acting machinery from a roller, $c$, upon which it has been wound, and passes over a table or support, $b$, immediately under the pen.

The reservoir containing the fluid and the pen therein, is supported above this table, upon legs or standards, $d\ d$. The standards carry a female screw, $d^1$, into which is screwed a circular box, $d^2$, containing a coil, $e$. On top of the coil is an insulating-plate, $f$, and above this the cover of the coil-box $f'$. This coil I prefer to make of No. 40 silk-covered copper wire, with a central opening of about half an inch in diameter.

One end of the wire composing the helix or coil is secured to the box itself, and as the latter and the female screw, and the supports $d\ d$, as also the table, are all made of metal, and the framing which supports the wheel-work and table is also metallic, a wire in connection with the framing will be in connection with one end of the coil.

The other end of the wire is secured to the cover $f'$ of the coil-box, insulated as before described, from the box, and this cover is pressed upon by a flexible piece of metal, attached to a rod, $g$. This rod, where it passes through the table $b$, is enclosed in a non-conducting tube, and is held by a set-screw, $g^1$, in a socket, projecting from a standard, $g^2$, secured to the non-conducting bed-plate of the machine. This standard is to be connected with the ground, and there will consequently be a connection between the ground or earth and that end of the coil which is attached to the cover of the coil-box.

In the circular opening through the coil is situated a part of the reservoir $h$. The reservoir shown in the drawings is cylindrical, with a spherical top, made by preference of vulcanite or hard rubber, and in pieces screwed together, to facilitate cleaning, and the introduction and removal of the pen, but its precise form is unimportant. It has a small opening at the bottom, through which the marking-part of the pen passes, and another opening at one side, $h^1$, through which its cavity connects with the bore of the regulating-tube. I prefer also to depress the top of the reservoir, as shown at $h^2$, for a purpose hereafter described. The reservoir is supported partly by resting upon the coil, partly by a catch, $g^3$, formed on top of the rod $g$.

The coil, and consequently the reservoir and pen, can be adjusted with reference to the paper by turning the coil-box, the lower part of which has a screw taking into the female screw $d^1$, and by raising or lowering the rod $g$, which is held in place at the desired elevation by the screw $g^1$.

The regulating-tube $k$, made by preference in the shape shown in the drawings, is connected to the reservoir, and extends down about as low as the bottom thereof. It is open at the bottom, and I prefer to cap the bottom with a cistern, $k^1$, simply slipped into a collar, $k^2$, which may be slid up and down upon the tube. All the joints between the open bottom of the tube and the open bottom of the reservoir should be air-tight or nearly so.

The pen that I prefer has a float attached, and is composed of a marking-part and two permanent magnets, with like poles opposed to each other. This pen consists of a hollow bulb and tube of glass. Into the tube are introduced the two magnets, separated by a glass thread or rod, and the glass of the tube is drawn to a tolerably fine point, with a small opening extending from the extremity up nearly to the lower pole of the lower magnet, where the opening is closed, either by a wad or by closing the bore. Another small hole leads from the periphery of the glass into the hole that extends to the point, and a small fibre, of cotton, silk, or other similar material, is passed from the point through both these holes, extending, therefore, from the point up inside the glass, and then outwards to the periphery of the glass, at a short distance above the point. The marking-portion of the pen may be made separate, and cemented to the lower part of the tube containing the magnets.

In the drawings, the bulb is shown at $m$, the tube at $m^1$, the magnets at $n\ n$, the point of the pen at $n^2$, the thread or fibre at $n^3$.

I prefer to make the float and pen of about the size and shape shown in the drawings, with magnets weighing about five and a half grains each, and when so made the float and pen will weigh about fifteen grains, and be of a little greater specific gravity than water at 76° Fahrenheit, but the pen and float may be of other sizes, forms, weight, and specific gravity, and may be, as a whole, lighter than water.

I prefer to make that part of the pen which projects through the bottom of the reservoir fit tolerably close to the aperture, so as to avoid escape of fluid, to fill the reservoir with ink composed of four drachms of soluble blue to a quart of rain or distilled water, and to keep the room in which the whole contrivance is worked at a tolerably even temperature; but I intend to use other inks and other kinds of pens and floats, and pens without floats, and other kinds of markers or marking-points, such, for instance, as the point composed of twisted corrugations, well known to makers of glass pens.

The depression, $h^2$, serves as a stop, limiting, if necessary, the upward motion of the pen, and its downward motion is limited by the paper.

The use of the regulating-tube is to balance, or nearly so, by means of the column of ink contained therein, the fluid-pressure of the ink in the reservoir, to prevent it from escaping at the bottom opening thereof, except as carried out by the pen; and if the cistern be used and partially filled, the effective length of the column of fluid in the tube can be adjusted by slipping the cistern up and down, and the flow of ink can thereby be regulated with great nicety, but I find in practice that it suffices to fill the tube at the start, to use no cistern, and when the ink has risen in the tube a quarter or half an inch, or thereabouts, owing to its flow through the pen, all that is necessary is to invert the reservoir and pour in a little more ink.

The amount of ink used is very small, and an effective level at the bottom of the tube, a quarter of an inch above the bottom of the reservoir, furnishes sufficient pressure to insure a good supply to the pen.

To those accustomed to work telegraphic instruments, it will be clear from this description that marks can be made upon paper passing over the table by changing the direction of currents through the coil, or by alternately making and breaking currents through the coil, in any proper way, or by an operator located at any proper distance from the coil, the ink always being present at the point or marking-part of the pen, and being transferred therefrom to the paper when the point strikes or rests upon the paper, and the length of the marks and the intervals between them are to be governed in the usual manner.

When fac-simile writing is desired, the motions of the paper and the breaking, making, or reversal of circuit or currents through the coil, are to be performed in a manner well known previous to my invention.

I intend at times to dispense with the regulating-tube, and to regulate the flow of ink, in all forms of the apparatus, by a stop-cock or valve, applied near the top of the reservoir, and so constructed that it may be nicely adjusted to permit the entrance of a minute quantity of air. A small aperture in the top of the reservoir, with a conical pin dropped into it, and controlled in position by a screw, forms a good valve, and this plan has been essayed successfully, but I prefer the regulating-tube.

As a means of controlling the vibrations of the pen, and additional to that secured by the adjustment of the reservoir up and down, or towards and away from the paper, I propose to employ, and have in practice employed, one or more permanent magnets set in such relation to the pen as either to tend to draw it towards or away from the paper, and by making such magnets adjustable in their distance from the pen, their effect upon the pen may be increased or diminished. This means of controlling the vibrations is highly useful, when, owing to leakage of current or other causes, the effective force of the coil diminishes or increases.

In fig. 1, two magnets are shown, one, $o$, a screw-shaped magnet, mounted in a female-screw cap, in such manner that the magnet can be made to enter the depression in the top of the reservoir to a greater or less extent, thereby being located nearer to or farther from the pen. The other magnet, $o'$, has a rack formed upon it, is slipped into a socket in the standard $g^2$, and can be moved up and down by the pinion with a milled head, $g^3$. This magnet will be slightly affected by the currents passing through the standard, but this may be avoided, if desired, by insulating it, or by making the connection in some other way. Its end nearest the pen enters the bottom of the table, and is surrounded by an insulating-tube, $g^4$, fig. 2. These magnets may be mounted and adjusted in any other proper or suitable manner.

Under the supposition that the pen and float are too heavy for effective work, when compared with the power of the coil, then the upper magnet, if set with its poles in such position that it attracts the pen, is to be approached to the pen. If the contrary be the case, and the pen and float as a whole are too buoyant, then the lower magnet is to be brought nearer. As these magnets, like all others, act with diminished intensity in a certain ratio to their distance from the object acted upon, their employment, even when non-adjustable, gives a certain sharpness and precision to the stopping and starting of the pen, accelerating its velocity at the ends of the stroke. Other advantages arising from the employment of these magnets will at once suggest themselves to the experienced telegraphic operator.

On Sheet II, I have indicated by drawings, in section, some of the other forms in which my invention may be embodied, the figures on this sheet being applied to the same parts as in the former figures.

In Figure 4, the pen is shown without a float, the two magnets $n\ n$ being attached together by a brass or non-magnetic connection, and the reservoir, &c., being as in fig. 1, Sheet I. When the magnets are employed in connection with the marker, and without any distinct or separate float, I at times intend to make them hollow, forming them of small steel tubes, plugged up at the ends or drawn to a point, and welded up there, or otherwise hollowed out so as to be of less specific gravity as a whole than if they were solid.

In Figure 5, the pen and float are similar to that in fig. 1, Sheet I, but so constructed as to work through an opening in the top of the reservoir, upon paper located above the pen. The regulating-tube is moreover inverted, and is, in fact, but little more than a mere ink-reservoir; it may be closed so that it and the reservoir become a siphon or barometric inkstand, or it may have a small aperture for air at top, as shown in the drawings.

In Figure 6, the pen has a float, and is siphon-pointed, the paper to be written on being located below the point. The reservoir in this figure has the aperture $h^1$ capped air-tight, and the short tube serves merely as an ink-reservoir and a duct, through which ink may be poured.

In Figure 7, also, the pen has a float, but in this case it is horizontal, and the coil is divided. I prefer to use a regulating-tube with this form of apparatus, but the opening $h^1$ may either be capped air-tight or have a small hole for the admission of air, with or without a valve.

In Figure 8, the pen has a float, and is composed of a magnet or magnets, and two marking-points, acting on two strips or sheets of paper. This plan has its advantages in insuring a correct record of the dispatch. If all works correctly, the two lines of writing will be counterparts of each other, that is to say, the marks on the one will correspond with the spaces on the other, when the Morse alphabet is employed. On one strip, the spaces, and on the other, the marks, will be read; and it is hardly possible that the whole dispatch, under any imperfections of working arising from atmospheric or other causes, cannot be made out from a comparison and collation of both the records.

In Figure 9, a plan for working the pen in a reservoir of fluid, which is not ink, is represented, the ink being contained in a separate reservoir. The marking-point of the pen has a hole through it, from bottom to top, or may have the same construction as the other points, or be of any proper construction, as may be all the other points, as before stated, but I prefer a hole extending through the point, or a deep groove in the point, with a fibre or thread enclosed. In this form of the contrivance, the fluid filling the reservoir may be water or spirits, and as its level will be affected by evaporation only, the plan presents some advantages, but, as before stated, the form which has acted the best in practice, is that shown on and described by reference to figs. 1, 2, and 3.

In all forms of my apparatus, it will be well to use some form of contrivance for making a call, but I prefer to use simply a magnifying-lens or mirror, or a mirror and lens; for instance, a magnifying-lens, either simple or compound, may be mounted with the pen-point in its focus, or the lens may be adjusted so as to magnify the reflection of the pen-point in a mirror, or a convex mirror may be applied to reflect the pen-point to the eye of the watcher, the apparatus serving in all cases to magnify the minute vibrations of the pen.

I prefer, whenever the pen is submerged in ink, that the ink shall be without any gum, size, or sugar, a fluid that does not grow thick or viscid by evaporation, for the reason that ink which becomes thick or gummy interferes with the action of the pen in passing through the opening in the reservoir.

I have contemplated other forms of my apparatus, but do not deem it necessary to describe them all, sufficient having been done in that line to show forth clearly the nature, character, and scope of my invention, as also the best way known to me of reducing the same to practice; but I desire to reiterate what has before been said in substance, viz, that one or more magnets or rods capable of being magnetized by induction, may be employed in any of the forms of pen; that marking-points of any suitable form may be substituted as equivalents of that specially described; that means, as described, other than the regulating-tube may be employed in all forms of the apparatus for regulating the flow of the fluid in which the pen is immersed; that the pen, when immersed in fluid other than ink, may obtain a supply of ink by various arrangements of ink-reservoir, and that my invention is not based on any special device for moving paper, or any special kind of motion of the paper; nor does my invention depend upon the employment of any special kind of wires, cables, circuit-makers and breakers, commutators, as they are sometimes called, or any special apparatus for changing the direction of a circuit, sometimes called pole-changers.

My invention resides in the pen, float, reservoir, regulating-tube, and controlling magnets, and their combination with each other and the coil, and with some known or appropriate machinery for causing paper to move in such relation to a pen as to have marks made thereon by vibrations of a pen such as I have invented.

I claim as of my own invention—

1. The combination of a pen with a reservoir.
2. The combination of a pen, reservoir, and coil.
3. The combination of a pen, reservoir, and coil, with paper properly actuated.
4. The combination of a pen, reservoir, and properly-moved paper.
5. The combination of a pen, float, and reservoir, and all of these in combination with a coil, and all of these also in combination with properly-actuated paper.
6. The combination of a pen and a reservoir, having an opening therein for the protrusion of the pen, with a regulating-tube, and all of these in combination, first, with a float, second, with a coil, and third, with properly-actuated paper.
7. The combination of a pen with a reservoir of fluid and a permanent magnet properly located, and all of these in combination, first, with a float, and second, with a coil, and thirdly, with both a coil and float.
8. The combination of a pen, a reservoir, and a coil, when the reservoir is vertical, and provided with an opening at the bottom thereof, and the pen passes through the opening, and the coil surrounds the vertical reservoir, and these parts thus relatively arranged in combination with a regulating-tube.
9. The combination of a pen, a vertical reservoir, open at bottom, a coil surrounding the reservoir, and a permanent magnet, located above the reservoir, and all these parts thus relatively arranged, in combination with a permanent magnet, located below the reservoir and pen.
10. The combination of the following parts, viz, a pen, a float, a reservoir of fluid, a regulating-tube, a coil, and paper properly actuated, and these in combination with a permanent magnet, so located as to influence the pen, all these combinations, and the parts or elements making up the combinations, being substantially such as herein specified and set forth.

GEORGE LITTLE.

Witnesses:
  FRAS. LOCKWOOD,
  JONATHAN MARSHALL.